United States Patent
Xiao et al.

(12) 
(10) Patent No.: US 8,723,034 B2
(45) Date of Patent: May 13, 2014

(54) JUNCTION BOX WITH IMPROVED WATERPROOF SEAL

(75) Inventors: Xue-Yuan Xiao, Kunshan (CN); Hong-Qiang Han, Kunshan (CN); Zi-Qiang Zhu, Kunshan (CN)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 36 days.

(21) Appl. No.: 13/542,640

(22) Filed: Jul. 5, 2012

(65) Prior Publication Data

US 2013/0008683 A1 Jan. 10, 2013

(30) Foreign Application Priority Data

Jul. 5, 2011 (CN) .......................... 2011 2 0234505

(51) Int. Cl.
*H01R 13/516* (2006.01)
*H01R 13/52* (2006.01)

(52) U.S. Cl.
USPC .............................................. 174/50; 174/60

(58) Field of Classification Search
USPC ......... 312/223.1; 174/520, 258, 350–354, 50, 174/60, 59, 44, 58; 439/535, 575, 527, 792; 361/752, 642, 826; 438/66, 122
See application file for complete search history.

(56) References Cited

U.S. PATENT DOCUMENTS

2011/0244719 A1* 10/2011 Xue et al. ...................... 439/575
2012/0000689 A1* 1/2012 Shu et al. ........................ 174/59

FOREIGN PATENT DOCUMENTS

EP 2279529 2/2011
JP 2000161496 A * 6/2000

OTHER PUBLICATIONS

English Translation of the Shiraki Katsuyoshi, JP2000-161496, dated Jun. 16, 2000, translated on Nov. 26, 2013.*

* cited by examiner

*Primary Examiner* — Robert J Hoffberg
*Assistant Examiner* — Michael Matey
(74) *Attorney, Agent, or Firm* — Wei Te Chung; Ming Chieh Chang

(57) ABSTRACT

A junction box includes a cable connecting box, a cover covering the cable connecting box and an o-ring sealing between the cover and the cable connecting box. The cable connecting box includes an insulative block, a plurality of contacting foils retained in the insulative block, a plurality of diodes connecting with two neighborly contacting foils and four walls surrounding around the insulative block. The cover defines a sealing slot for receiving the o-ring. The sealing slot has a bump at a place of the molding joint of the cover to enlarge a deformation of the o-ring for improving a waterproof effect of the junction box.

12 Claims, 11 Drawing Sheets

JUNCTION BOX WITH IMPROVED WATERPROOF SEAL

BACKGROUND OF THE INVENTION

1. Field of the Invention

The present invention generally relates to a junction box, and more particularly to a junction box with improved waterproof seal.

2. Description of Related Art

EP patent publication NO. 2279529 published on Feb. 2, 2011 discloses a PV junction box including an insulative box, a cover covering the insulative box, a plurality of connecting foils, a plurality of diodes connecting with two neighborly connecting foils and an o-ring sealing between the cover and the insulative box. The insulative box includes a bottom wall, a front wall, a rear wall and two side walls extending upwardly from the bottom wall and a cavity defined by these walls. The cover further comprises a plurality of separating walls extending downwardly all-around the cover and abutting against the walls of the insulative box and a slit for receiving the o-ring depressed on the separating wall. The o-ring is received in the slit and clamped between the separating walls and the walls of the insulative box. However, during the production process, the slit is formed with a plurality of lances around an inner face thereon, which may cause the o-ring and the slit can not closely attached together and make a poor waterproof effect.

Hence, an improved junction box is desired to overcome the above problems.

SUMMARY OF THE INVENTION

An objector of the invention is to provide a junction box with improved waterproof portion.

According to one aspect of the present invention, a junction box comprises a cable connecting box having a receiving cavity and four walls surrounding the receiving cavity. A cover formed with a plurality of separating walls extending from a peripheral thereof and engaging with corresponding walls of the cable connecting box when the cover covers the cable connecting box, the cover defining a sealing slot disposed along the separating walls, a bump disposed within the sealing slot; an o-ring set in the sealing slot to seal the separating walls of the cover and the four walls of the cable, and the bump forcing the o-ring to resist inner walls of the sealing slot.

Other objects, advantages and novel features of the present invention will become more apparent from the following detailed description of the present embodiment when taken in conjunction with the accompanying drawings.

DETAILED DESCRIPTION OF THE INVENTION

Figure 1:
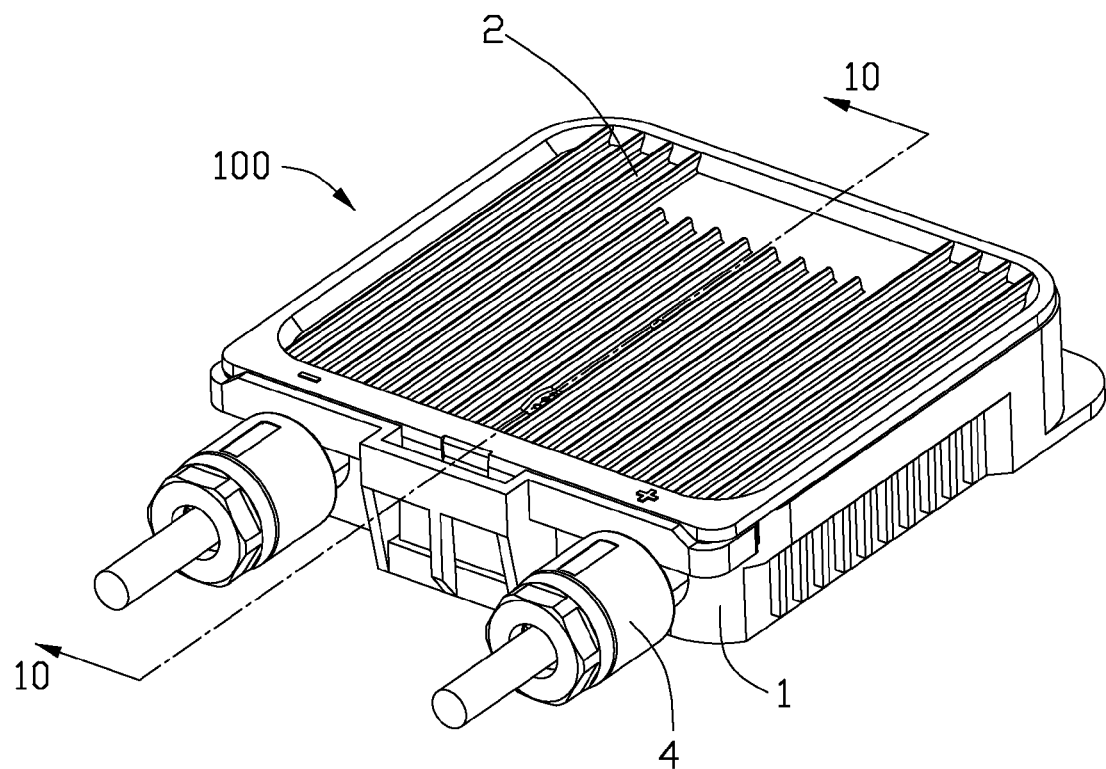
FIG. 1 is an assembled perspective view of a junction box according to a preferred embodiment of the present invention.
Figure 2:
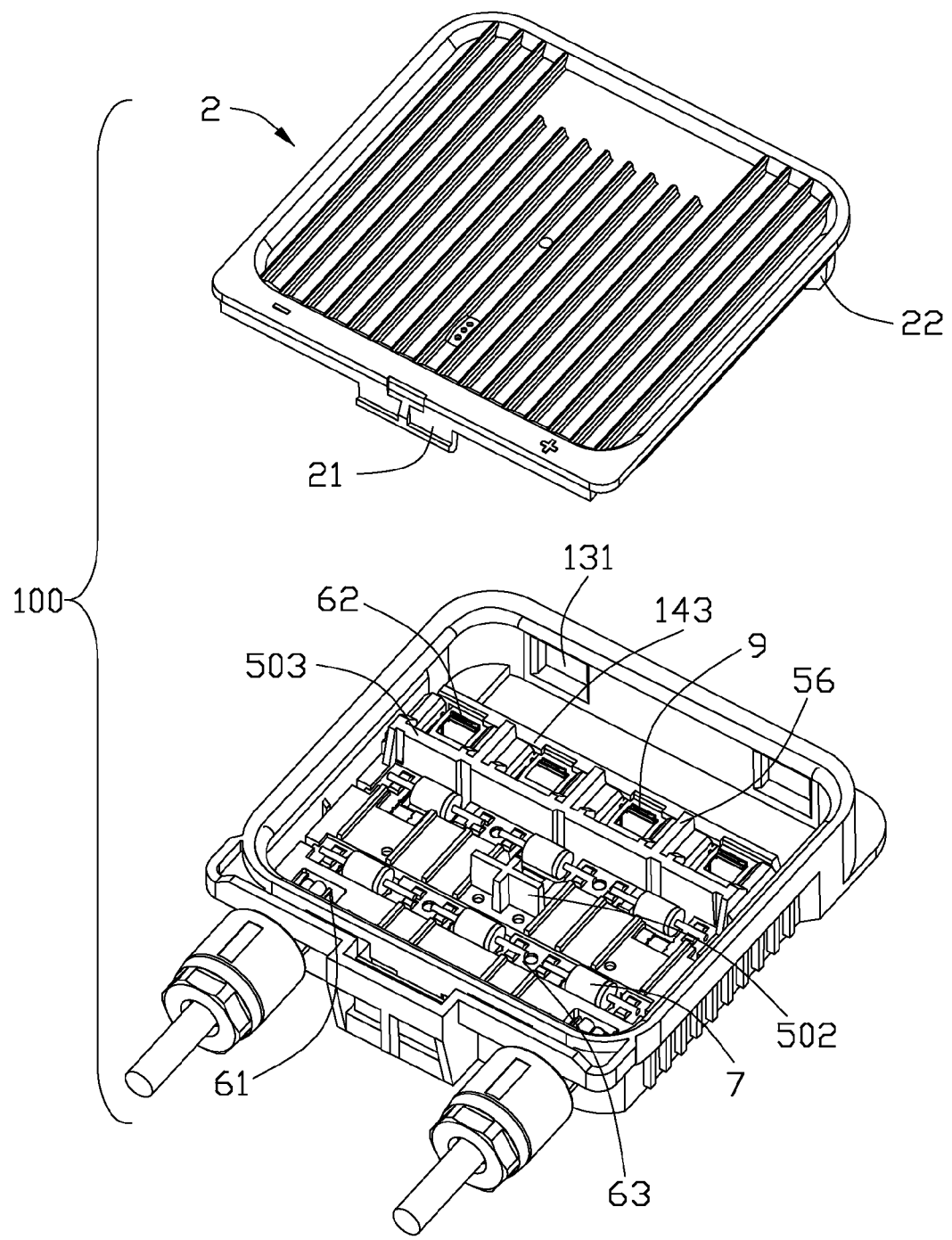
FIG. 2 is another assembled perspective view of the junction box according to the present invention, but taken from another view, which discloses the cover separated from a cable connecting box.

Reference will now be made to the drawing figures to describe the preferred embodiment of the present invention in detail.

Referring to FIGS. 1-11, a junction box 100 used for electrically connecting a photovoltaic (PV) module (not shown) and transmitting electrical current according to the present invention is disclosed. The junction box 100 includes a cable connecting box, a cover 2 covering an upper side of the cable connecting box and a cable 4 connecting with the cable connecting box. The cable connecting box includes a plastic insulative box 1 and a wire connecting module 3 attached to the insulative box 1.

Figure 3:
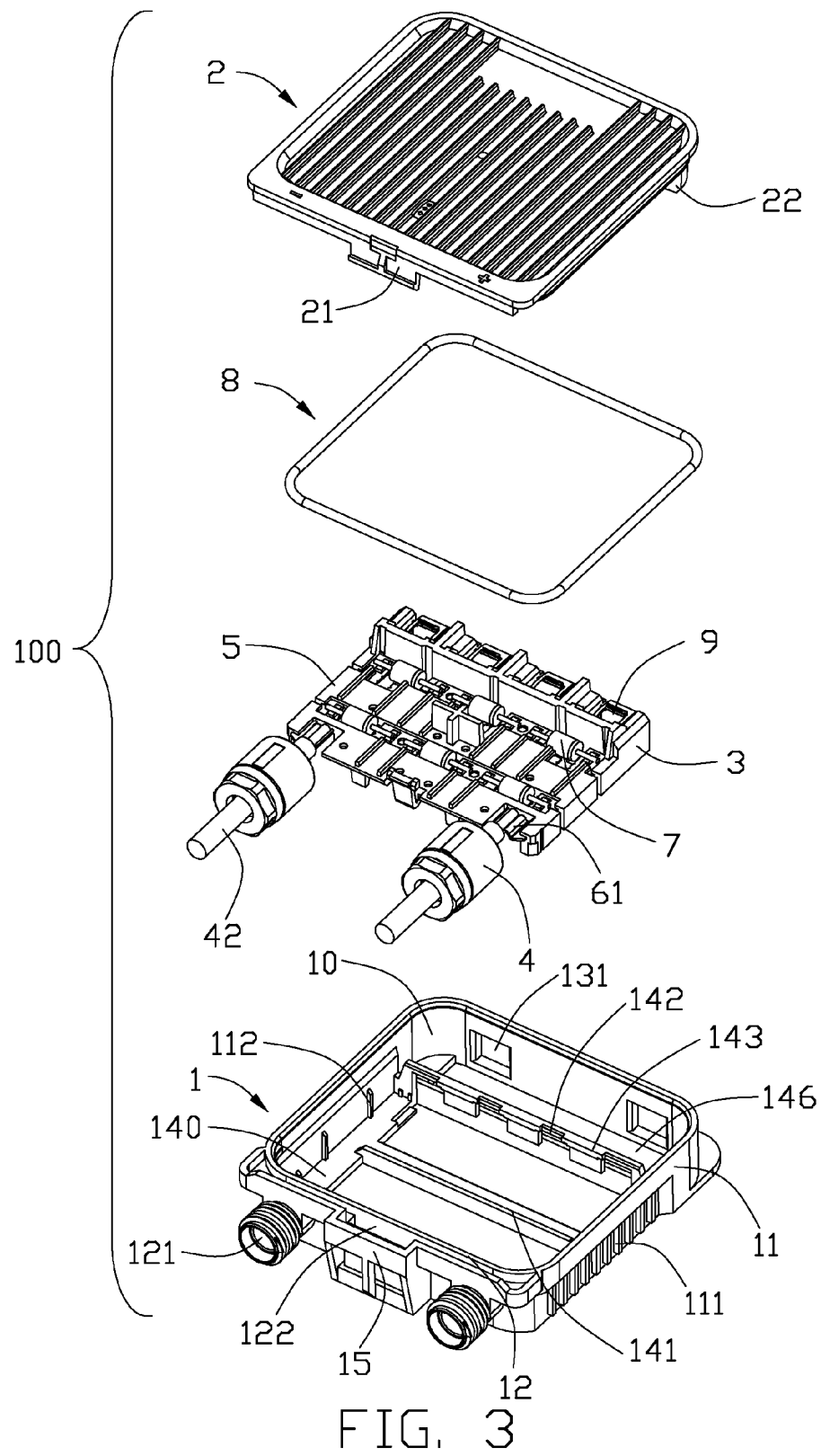
FIG. 3 a partly exploded perspective view of the junction box with a cover separated from the cable connecting box.
Figure 4:
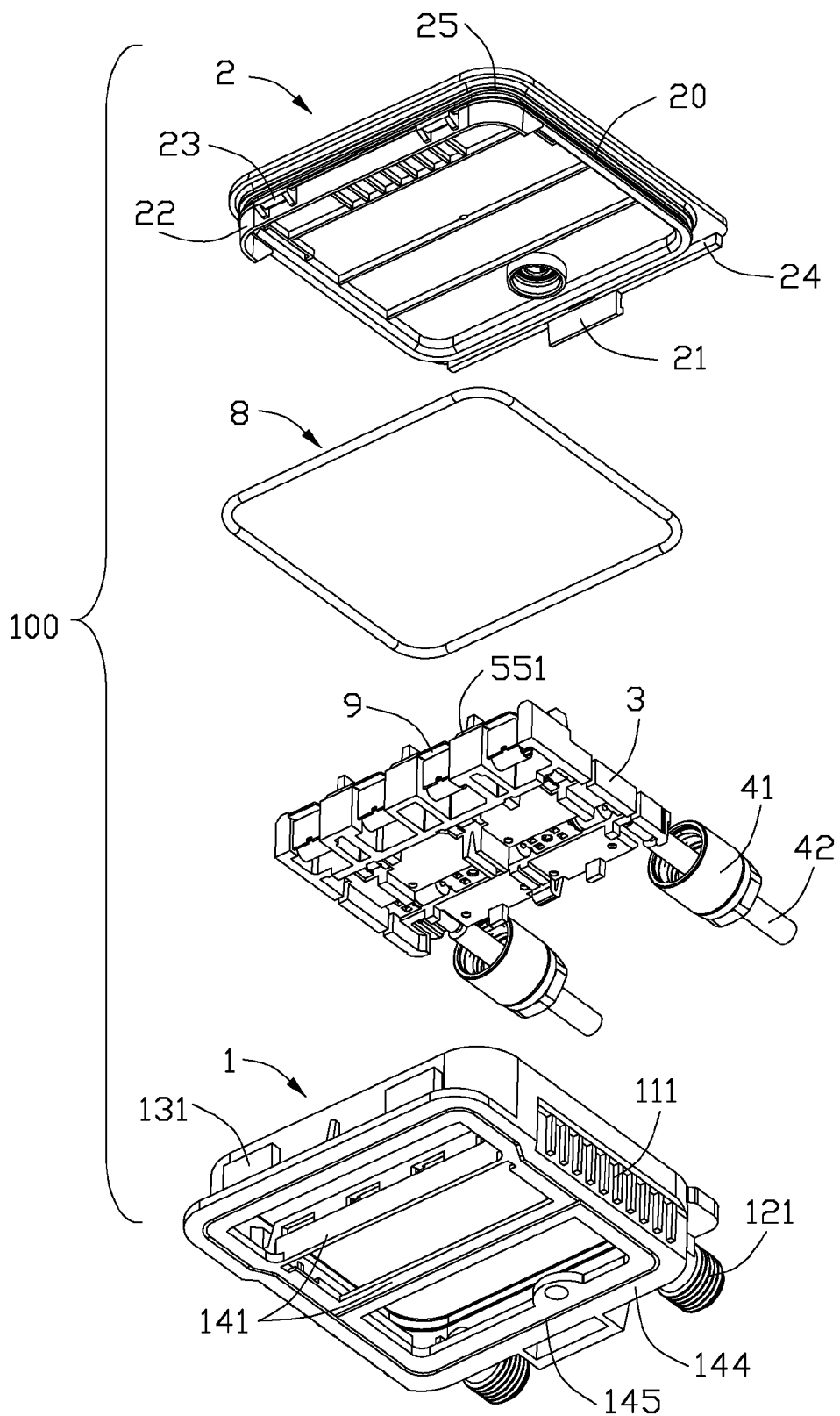
FIG. 4 is similar with FIG. 3, but taken from another view.
Figure 5:
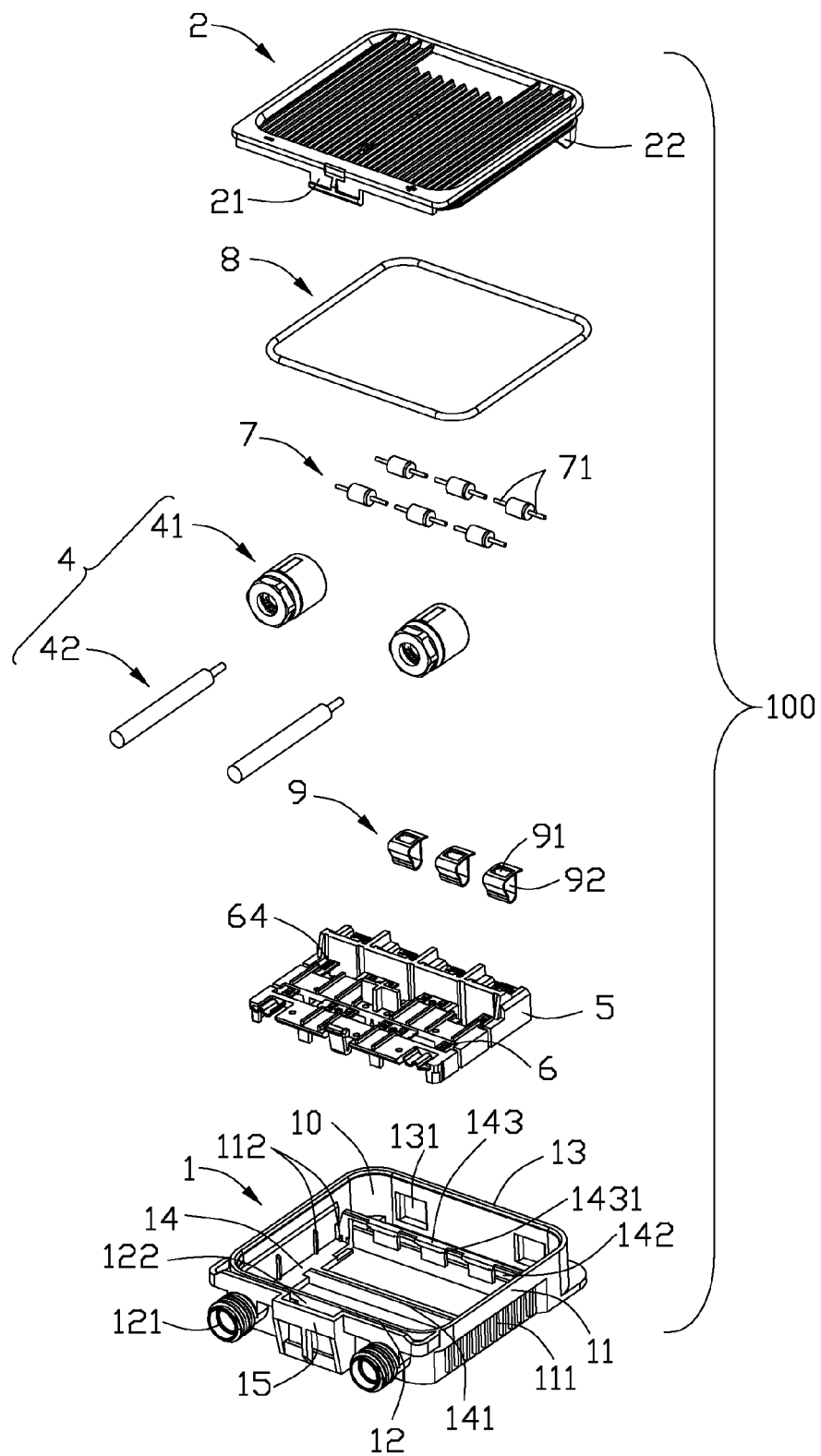
FIG. 5 is an exploded perspective view of the junction box.
Figure 6:
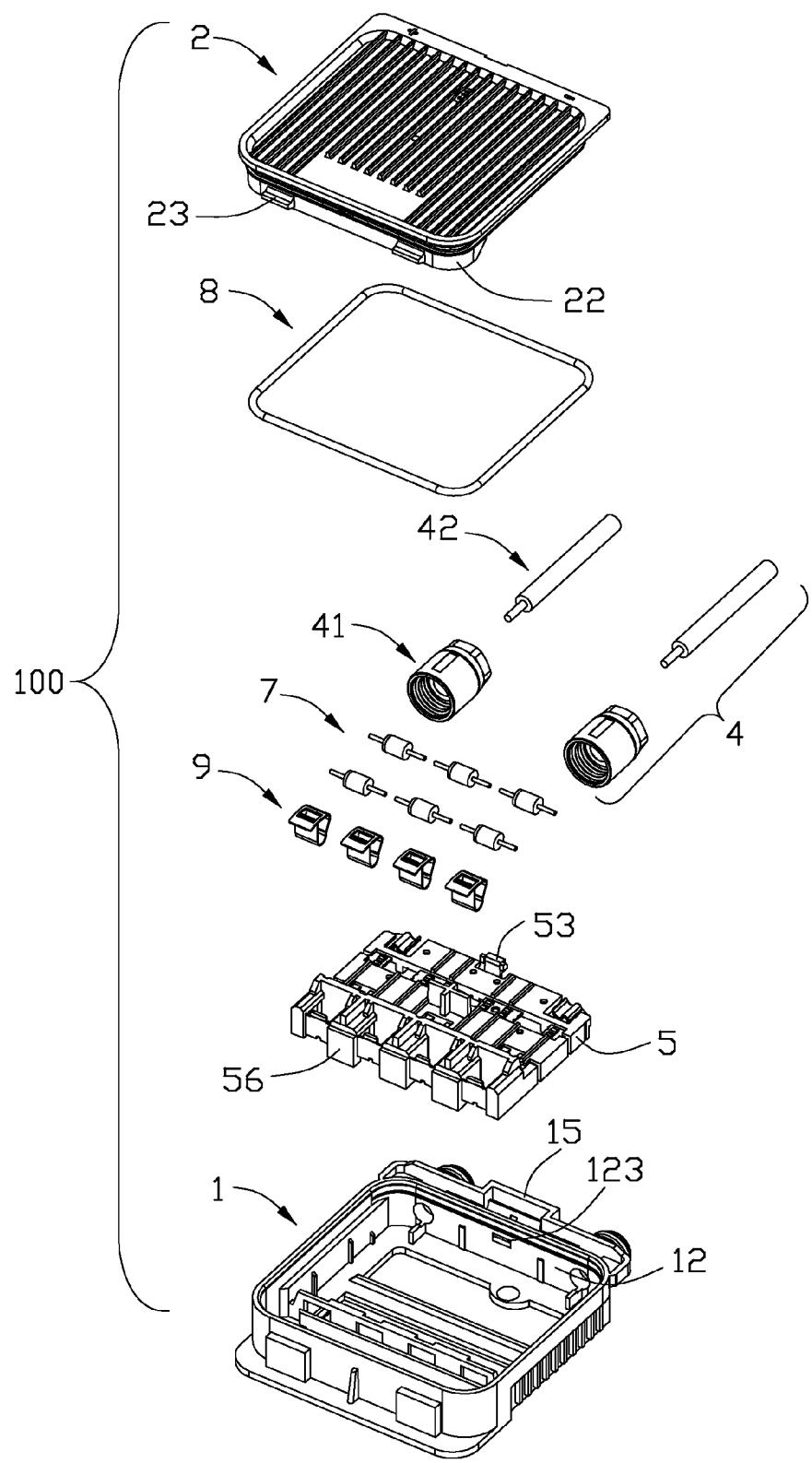
FIG. 6 is similar with FIG. 5, while taken from a different aspect.
Figure 7:
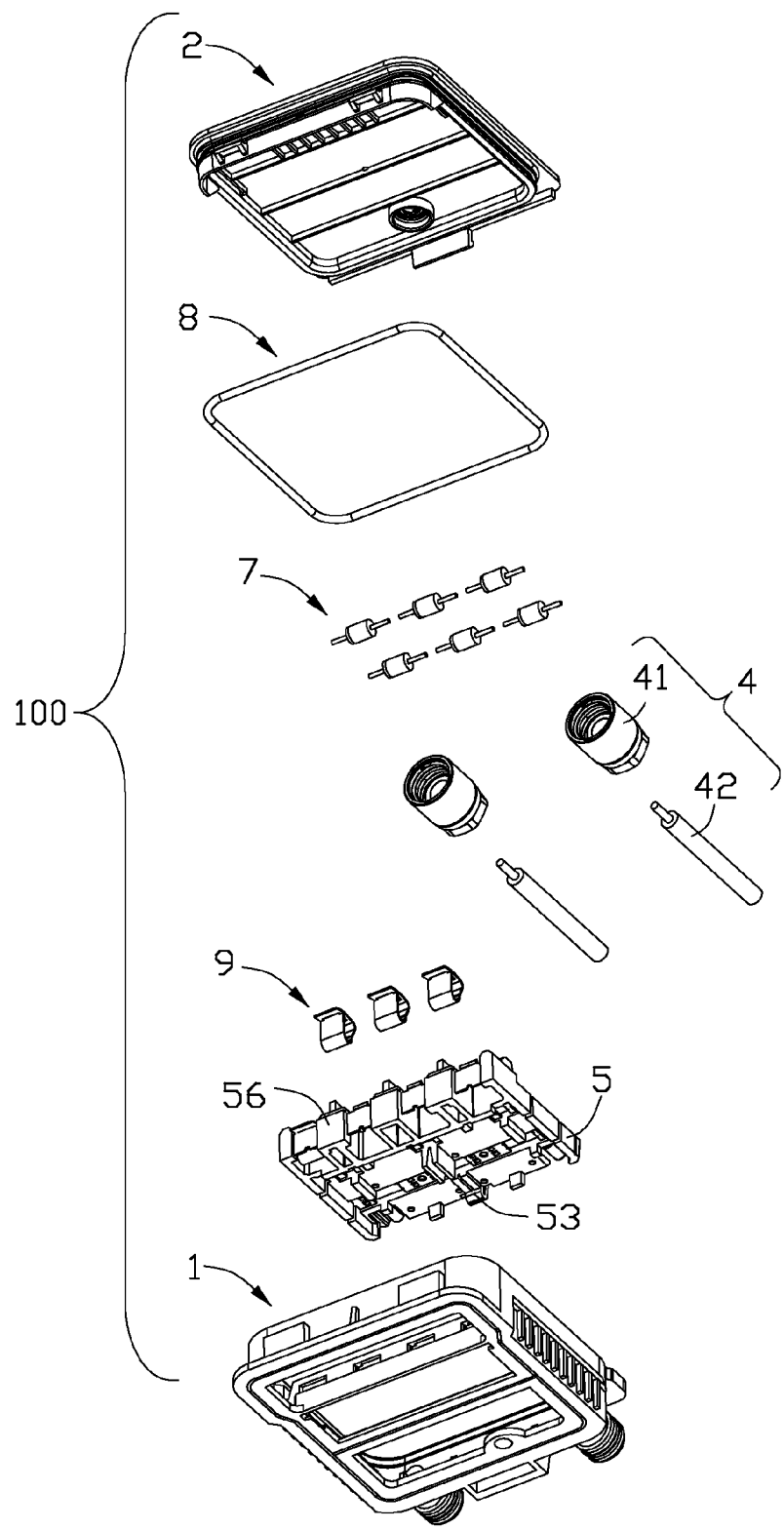
FIG. 7 is similar with FIG. 6, while taken from another different aspect.
Figure 8:
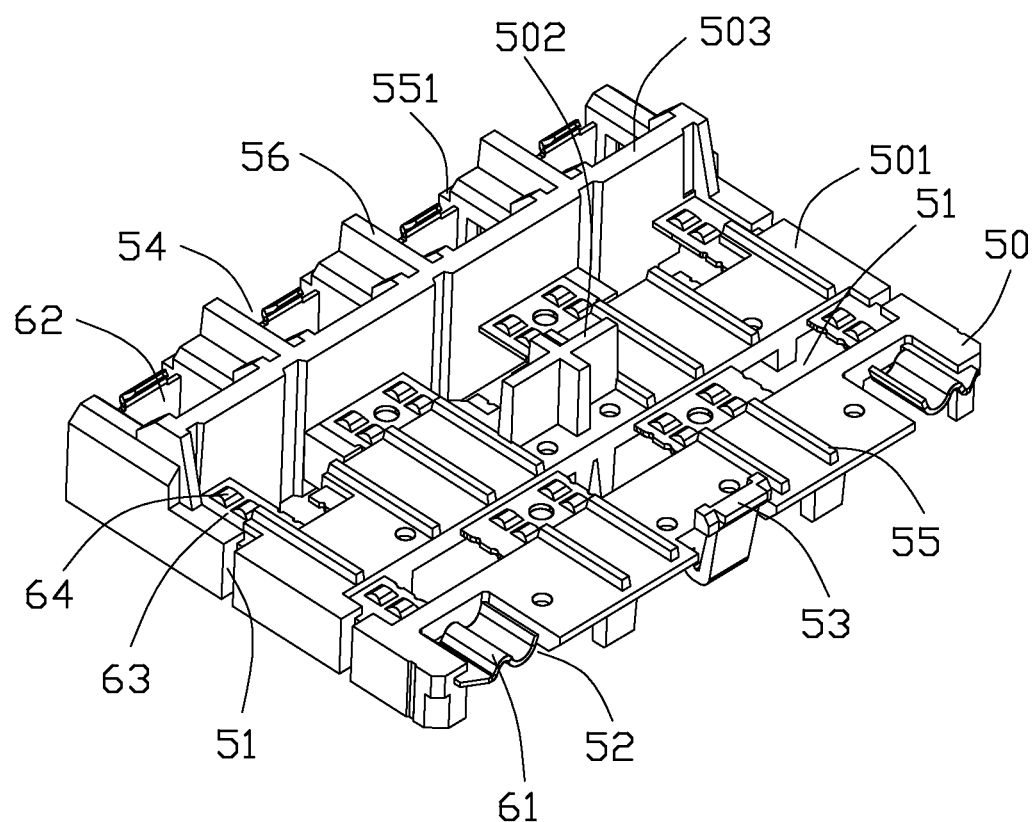
FIG. 8 is a perspective view of a wire connecting module of the junction box.

Please referring to FIGS. 3-5, the wire connecting module 3 includes a insulative block 5 presented as a rectangular shape, a plurality of metal contacting foils 6 and a plurality of diodes 7 connecting with two neighborly contacting foils 6.

Please referring to FIGS. 4-8, the insulative block 5 has a body portion 50 approximately shaped as a rectangular plate, a plurality of hollows 51 extending through the body portion 50 along an up-to-down direction. The body portion 50 has a top face 501 facing the cover 2 and a plurality of ribs 55 protruding upwardly from the top face 501.

In present invention, the insulative block 5 has two such hollows 51 arranged along a front-to-back direction. The insulative block 5 is divided into three portions along the front-to-back direction by the hollows 51, which extend along a transverse direction vertical to the front-to-back direction of the body portion 50. The first portion of the body portion 50 is formed with a pair of first escaping portions 52 at two sides of a front end thereof and a hook 53 at a middle of the front end thereof. The first escaping portions 52 extend through the body portion 50 along the up-to-down direction. The hook 53 extends forwardly and downwardly, then bents upwardly from the middle of the body portion 50. By this arrangement, the hook 53 may have a better resilient property to be removed easily.

The second portion of the body portion 50 includes a supporting portion 502 extending upwardly from the top surface 501 to support the cover 2. The third portion of the body portion 50 has a fence 503 extending along the transverse direction and located at a rear of the second portion, and a plurality of second escaping portions 54 recessed forwardly from a rear edge thereof. Each two adjacent second escaping portions 54 has a separating wall 56 therebetween. The separating wall 56 defines a plurality of depressions 551 at a top of a rear end of the separating wall 56. The ribs 55 extend along the front-to-back direction and are distributed uniformly on the top face 501 to enlarge an area for heat dissipation. The ribs 55 are parallel to each other. The ribs 55 provide a lager area for the junction box 100 heat dissipate timely.

The contacting foils 6 have a plurality of connecting portions 61 connecting with the cable 4 and received in the first escaping portions 52, a plurality of base portions mostly insert-molded in the body portions 50 and extending backwardly along a mating direction of the cable 4, and a plurality of contacting portions 62 extending backwardly from the base portion and connecting with the photovoltaic module. The base portions further have a plurality of soldering portions 63 exposed in the hollows 51. The soldering portions 63 have a plurality of embosses 64 protruding upwardly, each soldering portion 63 has a pair of embosses 64.

The junction box 100 further has a plurality of clamp springs 9 for clamping the contacting portions 62 of the contacting foils 6 and a plurality of contacting plates (not shown) of the photovoltaic module. One end of the clamp spring 9 defines a through hole 91, the other end of the clamp spring 9 has a tab 92 with a width of the tab 92 smaller than that of a body of the clamp spring 9. The tab 92 extends through the through hole 91, and the contacting portion 62 is clamped between the tab 92 and an inner wall of the through hole 91. Insert the contacting plate of the photovoltaic module into an area between the tab 92 and the inner wall of the through hole 91 and be clamped by the tab 92 and the inner wall of the through holes 91 to electrically connect the junction box 100 with the photovoltaic module.

Each of the diodes 7 has a pair of tails 71 extending outwardly from two sides thereof, each tail 71 is soldered between two adjacent embosses 64 of the soldering portions 63.

Please referring to FIGS. 1-7, and FIG. 10, the insulative box 1 presents as a rectangular box, including two side walls 11, a front wall 12 and a rear wall 13 connecting the two side walls 11, a receiving cavity 10 surrounding by the side walls 11, the front wall 12 and the rear wall 13. The insulative box 1 further comprises a bottom wall 14 located under the receiving cavity 10 and a supporting portion 15 connecting with two side walls 11 and located in front of the front wall 12. The supporting portion 15 presents as a T shape. The front wall 12 defines two side by side mounting holes 121 with exterior thread, from which the cable extending through to connect with the connecting portions 61. The mounting holes 121 are located under the supporting portion 15. A locking slot 122 is defined between the supporting portion 15 and the front wall 12 and opening upwardly, and a resilient locking portion 151 is formed in the locking slot 122. Please reference to FIGS. 10-11, the resilient locking portion 151 is extending upwardly from a bottom of the looking slot 122. A depressing slot 123 is recessed from a surface facing to the receiving cavity 10 for locking with the hook 53 of the insulative block 5. Please reference to FIG. 6, the hook 53 and the depressing slot 123 engage with each other, when the insulative block 5 is damaged, the user can remove the insulative block 5 away from the junction box 100 by levering the hook 53. So, the junction box 100 can be partly replaced to save cost. The two side walls 11 have a plurality of ribs 111 extending along the up-to-down direction on outsides of the side walls 11 to enlarge an area for heat dissipation. A plurality of position blocks 112 extend inwardly along the up-to-down direction on insides of the side walls 11 to engage with the insulative block 5.

The rear wall 13 defines two locking holes 131 extending through thereof along a front-to-back direction. The bottom wall 14 has a plurality of windows (not labeled) and two bridges 141 extending along a transverse direction between the windows and being parallel to each other. One of the bridge 141 closed to the rear wall 13 defines a plurality of openings 142 extending therethrough along a front-to-back direction and arranged side by side, the bridge 141 further has an pressing portion 143 located between two neighborly openings 142 to engage with the depression 551. A passageway 146 is formed between the bridge 141 near to the rear wall 13 and the rear wall 13 for the contacting plates of the photovoltaic module inserting into. Two sides of the pressing portion 143 extend outwardly till the opening 142 to from a pair of engaging portions 1431 to abut against a free end of the clamp spring 9 with the through hole 91 to prevent the clamp spring 9 from loosing. The bottom wall 14 defines an inner face 140, a mounting face 144 opposite to the inner face 140 and a slit depressing from the mounting face 144, the slit 145 is shown in a circle surrounding in the mounting face 144. The slit 145 can absorb much more glue which is used to stick the junction box 100 to the PV module to get a well combination.

Figure 9:
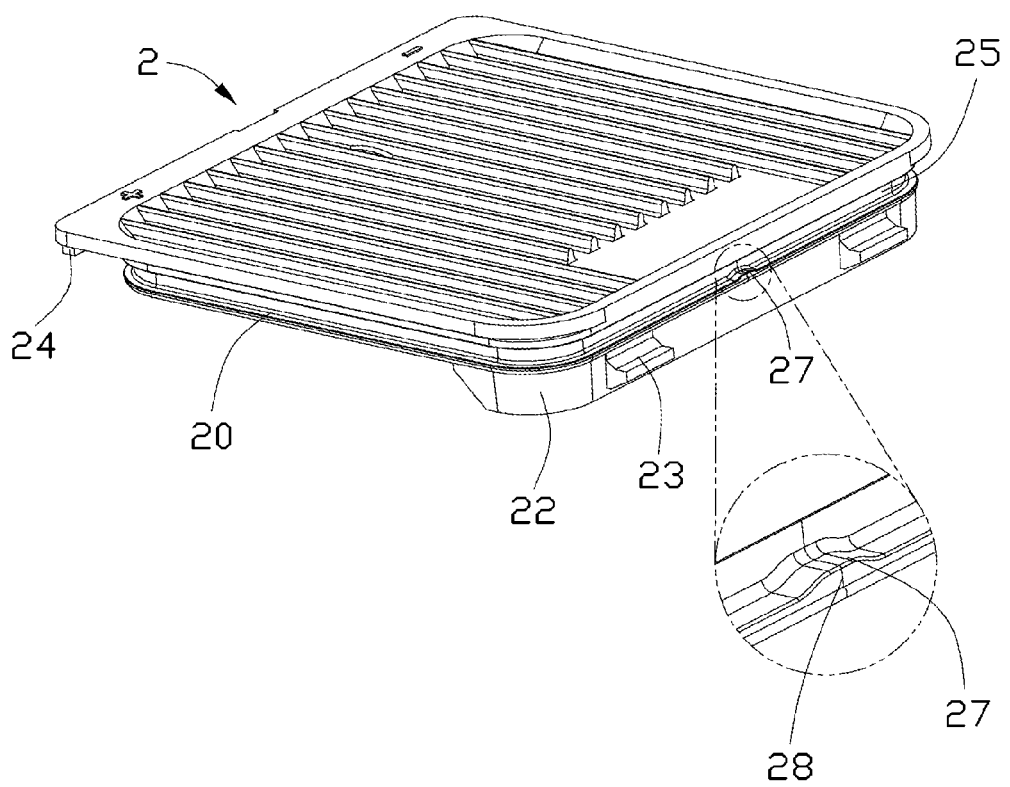
FIG. 9 is a perspective view of a cover of the junction box.
Figure 10:
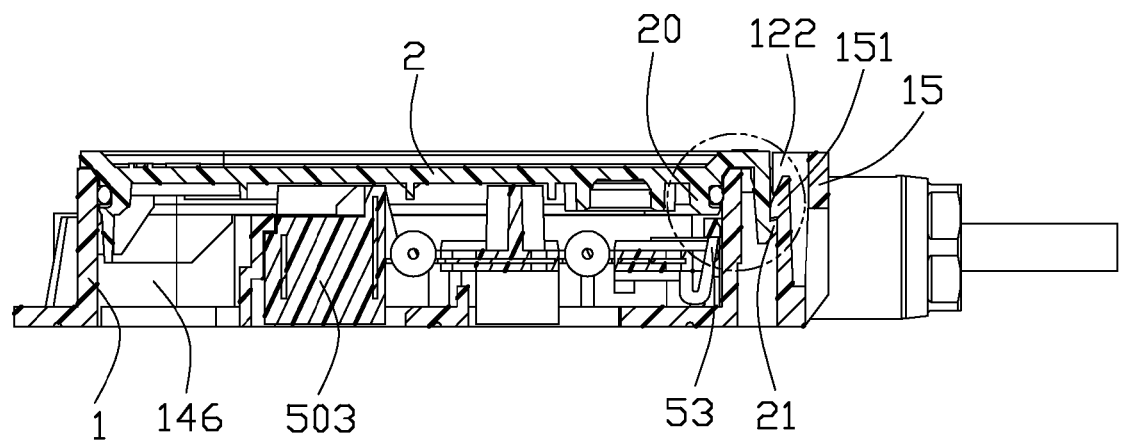
FIG. 10 is a cross-sectional view of the junction box taken along line 10-10 of FIG. 1.
Figure 11:
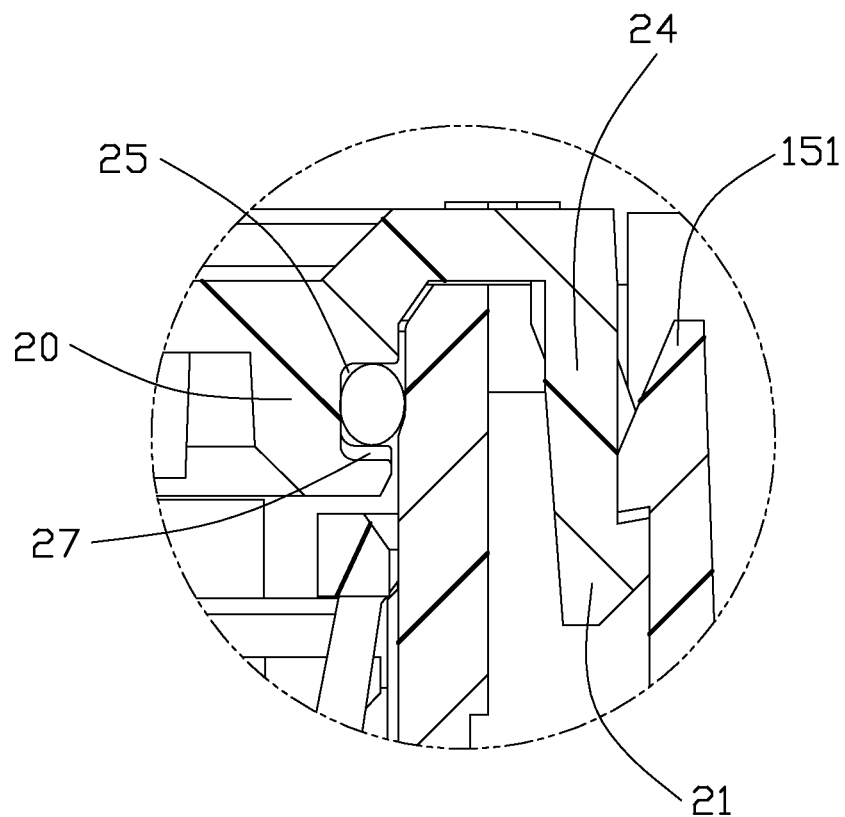
FIG. 11 is an enlarged view of the junction box in a circuit map to FIG. 10.

Please reference to FIGS. 9-11, the cover 2 comprises a plurality of separating walls 20 extending downwardly from peripheral of a top plate (not labeled) of the cover, the separating walls 20 connect with each other and abut against with an inner wall of the insulative box 1. The cover further comprises a pretending wall 24 extending downwardly form a front side of the cover and being parallel to the front wall 12 of the insulative box 1. The pretending wall 24 is located between the front wall 12 and the supporting portion 15. The cover 2 further comprises a latching portion 21 to locking with the resilient locking portion 151 of the insulative box 1. The latching portion 21 also can be set as a slot or a resilient barb. In the present invention, the latching portion 21 is a resilient barb locking with the resilient locking portion 151, and the pretending wall 24 is mostly received in the locking slot, a top face of the cover 2 and a top surface of the supporting portion 15 are coplanar to prevent user to open the junction box 100 only by hands. When the contacting portions 62 of the contacting foils 6 connect with the exterior contacting plates of the PV module in the passageway 146, for the contacting plates are easy to bent and may touch the inner wall of the insulative box 1 for its soft feature. A preventing blade 22 extends downwardly from a rear end of the cover 2 to provides an inner wall for the contacting plates depending on, so a height of the preventing blade 22 can increase a safe creepage distance for the junction box 100. The preventing blade 22 further has a plurality of protrusions 23 extending backwardly to lock with the locking holes 131 of the rear wall 13. The separating wall 20 defines a sealing slot 25 in its outside surface. An o-ring 8 mounted in the sealing slot 25 seals the insulative box 1 when the cover 2 covers the insulative box 1 to prevent water flowing into an inner side of the junction box 100. The cover 2 is molded by plastic and may has a molding joint 28 (shown in FIG. 9) passing through the sealing slot 25, a bump 27 is designed near the molding joint 28. The o-ring 8 is made of silicone or plastics materials and is formed in a rectangular circuit configuration. The molding joint 28 cause the sealing slot 25 uneven and may not be closely pressed by the o-ring 8, then, the bump 25 is disposed corresponding to the molding joint 28 and presses the o-ring 8 toward the molding joint 28 and ensure the o-ring 8 reliably resists the sealing slot 25 to improve a waterproof effect of the junction box 100. The bump 27 extends into the sealing slot 25 from a bottom face thereof. However, in some case, the molding joint may not appear. The bump 27 works once there is such a molding joint.

The cables 4 include two nuts 41 with interior thread and two wires 42 extending through the nuts 41 along a front-to-back direction. The interior threads of the nuts 41 match to the exterior threads of the mounting holes 121. The wires 42 insert into the insulative box 1 through the mounting holes 121 and electrically connect with the connecting portions 61 of the contacting foils 6 through the mounting holes 121, to finally position the cables to the insulative box 1.

As fully described above, the bump 27 which protrudes into the sealing slot 15 at the mold commissure of the cover 2 can enlarger a deformation of the o-ring 8 to eliminate an impact of lances caused by the molding joint, and guarantee the sealing effect of junction box 100, thereby improving the junction box 100 waterproof.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A junction box, comprising:
   a cable connecting box, having a receiving cavity and four box walls surrounding the receiving cavity, the four box walls comprise a front box wall, a rear box wall opposite to the front box wall and two side box walls connecting with front and rear box walls;
   a cover formed with a plurality of separating walls extending from a peripheral thereof, each of the separating walls abuts against an inside surface of a corresponding one of the four box walls when the cover covers the cable connecting box, a preventing blade extending from a bottom of the separating wall corresponding to the rear box wall and abutting against an inside surface of the rear box wall, and a sealing slot recessed in an outside surface of each of the separating walls, and a bump disposed within the sealing slot; and
   an o-ring set in the sealing slot to seal the separating walls of the cover and the four box walls of the cable connecting box, and the bump forcing the o-ring toward an opposing portion of the sealing slot.

2. The junction box as claimed in claim 1, wherein the bump extends into the sealing slot from a bottom wall of the sealing slot.

3. The junction box as claimed in claim 1, wherein the o-ring is clamped between the four box walls and the separating walls.

4. The junction box as claimed in claim 1, wherein the cable connecting box further comprises a bottom box wall located under the receiving cavity, the preventing blade extends till the bottom box wall.

5. The junction box as claimed in claim 4, wherein the junction box is a PV junction box and comprises a wire connecting module received in the receiving cavity, the wire connecting module comprises a plurality of connecting portions adapted to connect with contacting plates of a PV module, the preventing blade separates the connecting portions from the rear box wall.

6. The junction box as claimed in claim 5, wherein the bottom box wall defines a passageway for the connecting portions adapted to connecting with the contacting plates of the PV module.

7. The junction box as claimed in claim 1, wherein the rear box wall defines a plurality of locking holes, the preventing blade comprises a plurality of protrusions locking with the locking holes.

8. A junction box comprising:
   a cable connecting box comprising:
      a plurality of first side walls commonly defining a receiving cavity, and
      an insulative block received in the receiving cavity, a plurality of contacting foils insert-molded in the insulative block and a plurality of diodes connecting with two neighborly contacting foils of the plurality of contacting foils, the insulative block having a top face with a plurality of ribs, extending along a front-to-back direction located thereon;
   a cover covering the cable connecting box, the cover defining a top plate with a plurality of second side walls downwardly extending therefrom, said top plate seated upon the first side walls while each of the second side walls received in the receiving cavity and intimately inside a corresponding one of the first side walls, a preventing blade extending from a bottom of one of the second side walls, the preventing blade extending between the one of the second side walls and the insulative block; and
   a cable electrically connecting with the cable connecting box.

9. The junction box as claimed in claim 8, wherein the ribs protrude upwardly form the top face along a direction of the cable connecting with the cable connecting box.

10. The junction box as claimed in claim 9, wherein the ribs are parallel to each other.

11. The junction box as claimed in claim 8, wherein the insulative block presents as a rectangular shape and comprises a plurality of hollows extending therethrough to divide the insulative block into several portions.

12. A junction box comprising:
   a cable connecting box defining a plurality of first side walls commonly defining a receiving cavity;
   a cover covering the cable connecting box, the cover defining a top plate with a plurality of second side walls downwardly extending therefrom, said top plate seated upon the first side walls while each of the second side walls received in the receiving cavity and intimately inside a corresponding one of the first side walls;
   a sealing slot continuously extending horizontally and transversely along exterior faces of said second side walls, the sealing slot having a bump adjacent to position where a molding joint occurs during injection molding of the cover, the bump extending into the sealing slot from a face of the sealing slot; and
   a sealing ring snugly received in the sealing slot;
   wherein said bump enhances tension between the sealing ring and the sealing slot for avoiding loose arrangement therebetween due to a recess derived from the molding joint without said bump.

\* \* \* \* \*